US012605787B2

(12) United States Patent
Nakada et al.

(10) Patent No.: US 12,605,787 B2
(45) Date of Patent: Apr. 21, 2026

(54) RESISTANCE SPOT WELDING METHOD AND RESISTANCE SPOT WELDING APPARATUS

(71) Applicant: TOYOTA JIDOSHA KABUSHIKI KAISHA, Toyota (JP)

(72) Inventors: Koki Nakada, Toyota (JP); Kyosuke Izuno, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 984 days.

(21) Appl. No.: 17/692,451

(22) Filed: Mar. 11, 2022

(65) Prior Publication Data

US 2022/0314358 A1 Oct. 6, 2022

(30) Foreign Application Priority Data

Mar. 31, 2021 (JP) ................................. 2021-060399

(51) Int. Cl.
B23K 11/11 (2006.01)
(52) U.S. Cl.
CPC ................................... B23K 11/115 (2013.01)
(58) Field of Classification Search
CPC ... B23K 11/115; B23K 11/163; B23K 11/185; B23K 11/256; B23K 11/257; B23K 11/34; B23K 2101/006; B23K 2103/10

USPC ........................................................ 219/91.2
See application file for complete search history.

(56) References Cited

U.S. PATENT DOCUMENTS

2019/0275606 A1 9/2019 Nomura et al.

FOREIGN PATENT DOCUMENTS

| AT | 508601 | * | 2/2011 |
| AT | 508601 | A1 | 2/2011 |
| CN | 107350613 | A | 11/2017 |
| JP | 01-306078 | A | 12/1989 |
| JP | 05-078193 | A | 3/1993 |
| JP | 05-261562 | A | 10/1993 |
| JP | 10-113724 | A | 5/1998 |
| JP | 5130475 | * | 1/2013 |
| WO | 2011/017722 | A1 | 2/2011 |
| WO | 2020/009635 | A1 | 1/2020 |

* cited by examiner

*Primary Examiner* — Ibrahime A Abraham
*Assistant Examiner* — Joseph W Iskra
(74) *Attorney, Agent, or Firm* — Sughrue Mion, PLLC

(57) ABSTRACT

A resistance spot welding method includes the steps of: removing at least part of oil on a surface of a welding target material by energization between a pair of electrodes; and after the oil removal step, forming a nugget in an overlapped portion of the welding target material by energization between the pair of electrodes.

13 Claims, 10 Drawing Sheets

Fig.5

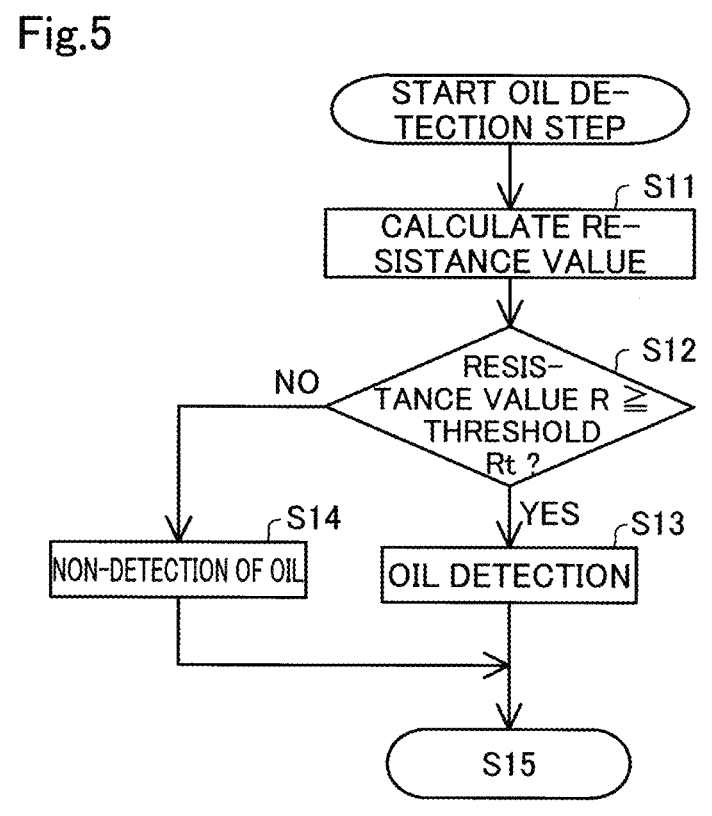

```
        ┌──────────────────────┐
        │  START OIL DE-       │
        │  TECTION STEP        │
        └──────────────────────┘
                   │
                   ▼        ┌─ S11
        ┌──────────────────────┐
        │  CALCULATE RE-       │
        │  SISTANCE VALUE      │
        └──────────────────────┘
                   │
                   ▼
              ╱─────────╲      ┌─ S12
            ╱  RESIS-     ╲
   NO     ╱  TANCE VALUE R ≧ ╲
 ◄───────╱    THRESHOLD       ╲
          ╲     Rt ?          ╱
            ╲               ╱
              ╲───────────╱
   │               │ YES
   │               ▼        ┌─ S13
   ▼    ┌─ S14  ┌──────────────────┐
┌──────────────────────┐  │  OIL DETECTION   │
│ NON-DETECTION OF OIL │  └──────────────────┘
└──────────────────────┘          │
   │                              │
   └──────────────────►───────────┤
                                  ▼
                        ┌──────────────────┐
                        │       S15        │
                        └──────────────────┘
```

| LEVEL | | ENERGIZATION TIME[ms] | | | |
|---|---|---|---|---|---|
| | | 30 | 50 | 100 | 120 |
| CURRENT VALUE [kA] | 2 | C | C | C | C |
| | 5 | C | A | A | B |
| | 9 | C | A | A | B |
| | 12 | C | B | B | B |

C : RESISTANCE VALUE CANNOT BE REDUCED

A : RESISTANCE VALUE IS REDUCED

B : RESISTANCE VALUE IS REDUCED, AND THE
FINAL NUGGET DIAMETER IS DECREASED.

Fig.9

RESISTANCE SPOT WELDING METHOD AND RESISTANCE SPOT WELDING APPARATUS

CROSS REFERENCE TO RELATED APPLICATIONS

This application is based upon and claims the benefit of priority from the prior Japanese Patent Application No. 2021-60399, filed on Mar. 31, 2021, the contents of which are incorporated herein by reference in its entirety.

BACKGROUND

Field

The present disclosure relates to a resistance spot welding method and a resistance spot welding apparatus.

Related Art

In press working of metal plates used for vehicles, press oil is conventionally known to be applied to the surface of a metal plate for the purpose of improving press workability, as described, for example, in Japanese Patent Application Publication No. 10-113724. The metal plates that have been subjected to press working into a predetermined shape are then joined together, for example, by resistance spot welding. In the resistance spot welding, two or more metal plates are placed to overlap each other, sandwiched between a pair of electrodes, and then joined together by being energized while applying pressure thereto.

However, when spot welding is performed on a metal plate with oil applied to its surface, excessive resistive heat generation due to the oil occurs during welding, which may promote excessive growth of a nugget in the direction of energization. Consequently, the surface temperature of the electrode increases, whereby the electrode may be fused to the metal plate.

SUMMARY

According to one aspect of the present disclosure, a resistance spot welding method is provided. The resistance spot welding method is a method in which a welding target material including a plurality of metal members overlapping each other is joined by being sandwiched between a pair of electrodes and energized with the electrodes, wherein a surface of the welding target material facing the electrode is provided with oil, the method including the steps of: removing at least part of the oil on the surface by energization between the pair of electrodes; and after the oil removal step, forming a nugget in an overlapped portion of the welding target material by energization between the pair of electrodes.

BRIEF DESCRIPTION OF THE DRAWINGS

FIG. 5 is a diagram illustrating a control flow in an oil detection process.

FIG. 7 is a diagram illustrating joint test results obtained when changing a current value and an energization time as appropriate.

FIG. 9 is a diagram illustrating an example of changes in current value and resistance value during welding in a comparative embodiment.

DETAILED DESCRIPTION

A. First Embodiment

Figure 1:
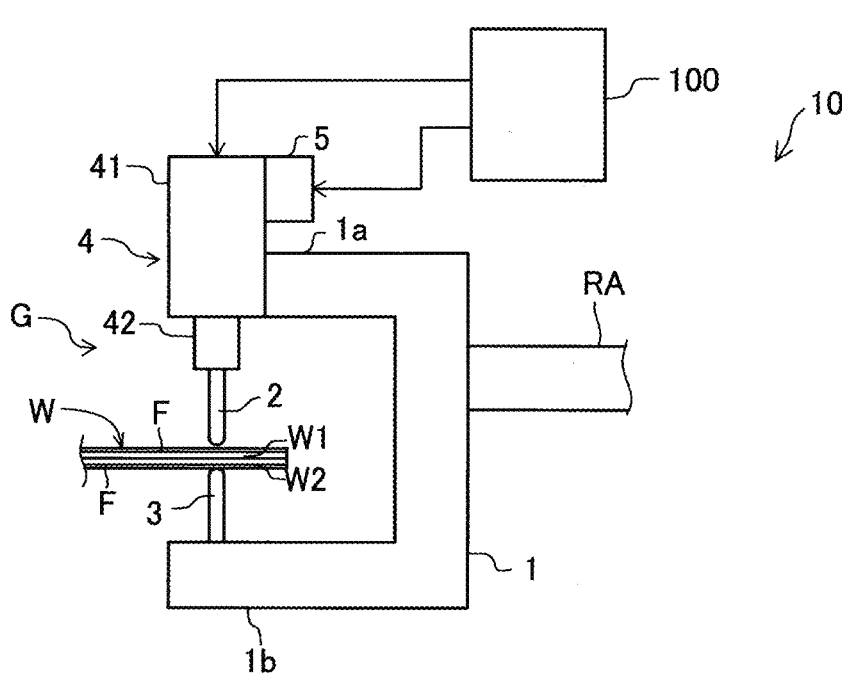
FIG. 1 is a schematic configuration diagram illustrating a resistance spot welding apparatus as a first embodiment of the present disclosure.

A1. Entire Configuration of Resistance Spot Welding Apparatus:

A resistance spot welding method and a resistance spot welding apparatus 10 in a first embodiment of the present disclosure will be described with reference to FIGS. 1 to 8. FIG. 1 is a schematic configuration diagram illustrating the resistance spot welding apparatus 10 of the first embodiment of the present disclosure. In the resistance spot welding method and the resistance spot welding apparatus 10 of the first embodiment, a plurality of (two in the present embodiment) metal members W1 and W2 are joined together by resistance spot welding. In the present embodiment, plate materials W1 and W2 made of an aluminum alloy (hereinafter simply referred to as an "aluminum alloy plate" or a "metal plate") are joined together as the plurality of metal members W1 and W2.

On the surfaces of the aluminum alloy plates W1 and W2, for example, there remains press oil or anti-corrosion oil which is applied for the purpose of improving press workability during press working, which is a pre-process before the resistance spot welding. Thus, an oil film F is formed on each of the front and back surfaces of a welding target material W, which is composed of two aluminum alloy plates W1 and W2 that overlap each other. In the following description, the lower side in FIG. 1 is referred to as "lower", while the upper side is referred to as "upper".

First, the entire configuration of the resistance spot welding apparatus 10 will be described. As illustrated in FIG. 1, the resistance spot welding apparatus 10 includes a spot welding gun G, a robot arm RA, and a controller 100. The spot welding gun G includes a gun body 1, a pair of electrodes, namely, an upper electrode 2 (– electrode) and a lower electrode 3 (+ electrode), an electrode lifting device 4, and a current regulator 5.

The gun body 1 is held by the robot arm RA. The upper electrode 2 is attached to an upper portion 1a of the gun body 1 via the electrode lifting device 4. The lower electrode 3 is attached to a lower portion 1b of the gun body 1. The tip of the upper electrode 2 and the tip of the lower electrode 3 are disposed opposite each other. When the welding target material W is welded, the welding target material W is sandwiched between and pressurized by the upper electrode 2 and the lower electrode 3, and then current is applied between the upper and lower electrodes 2 and 3. Thus, the welding target material W is molten by the resistive heat generation and then solidified, whereby the plurality of aluminum alloy plates W1 and W2 are joined together.

The electrode lifting device 4 is an electric device that holds and lifts the upper electrode 2. The electrode lifting device 4 is attached onto the tip of the upper portion 1a of the gun body 1. The electrode lifting device 4 includes a servo motor 41 and a lifting member 42 coupled to a driving shaft of the servo motor 41 via a gear. The electrode lifting device 4 lifts the lifting member 42 by operating the servo motor 41 according to a command signal from the controller 100. The welding target material W is sandwiched between and held by the upper electrode 2 and the lower electrode 3 in a state where the lifting member 42 is lowered.

The current regulator 5 regulates the value of a welding current that flows between the upper electrode 2 and the lower electrode 3 (hereinafter also referred to as "welding current value I" or simply "current value I") according to a current command signal transmitted from the controller 100. Known devices, such as a device with a variable resistor and a device equipped with a converter, for example, are applicable as the current regulator 5.

Figure 2:
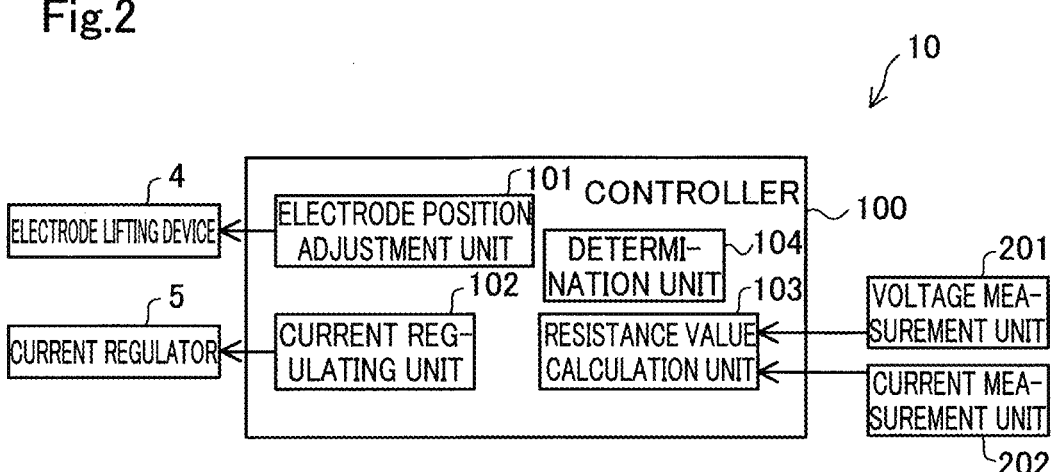
FIG. 2 is a partial functional block diagram of the resistance spot welding apparatus.

Next, the controller 100 of the resistance spot welding apparatus 10 will be described. The controller 100 integrally controls the operation of the resistance spot welding apparatus 10, specifically, the current value, the energization time, the pressurizing force applied onto the electrodes, the energization timing, the pressure application timing, and the like. FIG. 2 is a partial functional block diagram of the resistance spot welding apparatus 10. FIG. 2 illustrates only the partial functional block diagram mainly constituted of the controller 100 in the resistance spot welding apparatus 10. As illustrated in FIG. 2, the controller 100 includes an electrode position adjustment unit 101, a current regulating unit 102, a resistance value calculation unit 103, and a determination unit 104.

The controller 100 is configured to include a CPU, a ROM, a RAM, and an input/output interface, etc., which are not illustrated in the figure, and stores various control programs. By executing the control program stored in advance, the controller 100 functions as the electrode position adjustment unit 101, the current regulating unit 102, the resistance value calculation unit 103, and the determination unit 104.

The electrode position adjustment unit 101 transmits an electrode position command signal according to the conditions of a predetermined electrode position, to the electrode lifting device 4 during welding. The current regulating unit 102 transmits a current command signal according to the conditions of a welding current value, to the current regulator 5. This specific control of a welding current value by the current regulating unit 102 will be described below together with the welding method.

The resistance spot welding apparatus 10 further includes a voltage measuring unit 201 and a current measuring unit 202. The voltage measuring unit 201 detects a voltage between the respective electrodes (a potential difference). The current measuring unit 202 detects an actual value of the welding current that flows through between the respective electrodes. The voltage measuring unit 201 and the current measuring unit 202 are electrically connected to the controller 100.

The resistance value calculation unit 103 calculates a value of electrical resistance using the welding voltage value and the welding current value measured during energization. Specifically, the resistance value calculation unit 103 calculates a value of electrical resistance (hereinafter also referred to as an "electrical resistance value R" or simply a "resistance value R") by dividing the welding voltage value by the welding current value. The welding voltage value is a value measured by the voltage measuring unit 201. The welding current value is a value measured by the current measuring unit 202.

The determination unit 104 compares the electrical resistance value R calculated by the resistance value calculation unit 103 and a predetermined upper limit of threshold Rt, and determines whether an oil removal step (S20, see FIG. 3) to be described later is performed, based on the comparison result. It is noted that the resistance spot welding apparatus 10 has, in addition to those described above, a database storing information on a plurality of types of welding target materials W, a database storing a plurality of welding conditions according to the type of the welding target material W, and the like.

Figure 3:
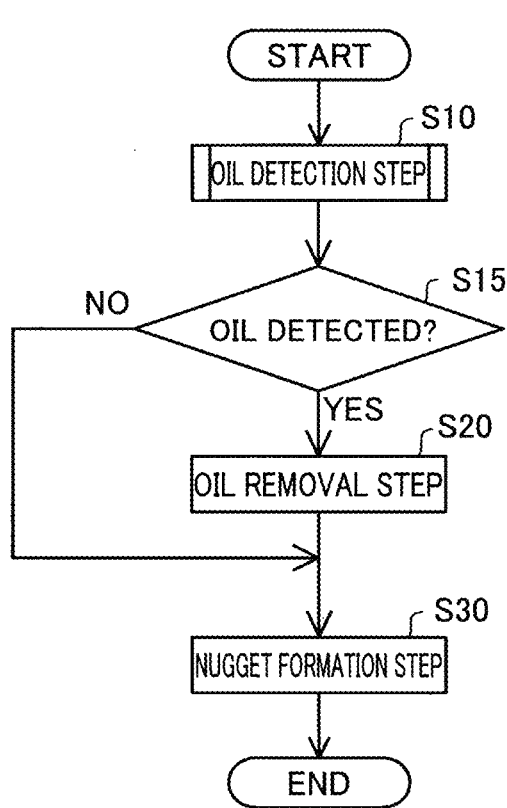
FIG. 3 is a flowchart of a resistance spot welding method as the first embodiment of the present disclosure.

A2. Resistance Spot Welding Method:

Next, the resistance spot welding method using the above-described resistance spot welding apparatus 10 will be described. FIG. 3 is a flowchart of the resistance spot welding method as the first embodiment of the present disclosure. Each step described below is performed by the controller 100. As illustrated in FIG. 3, in the resistance spot welding method, an oil detection process is first performed in step S10 (hereinafter, the step being abbreviated as "S"). Then, in S15, it is determined whether oil is detected or not. When the oil is detected (S15: YES), the operation proceeds to S20, in which the oil removal process is performed. After the oil removal process, a nugget formation process is performed in S30. If no oil is detected in S15 (S15: NO), the nugget formation process is performed in S30 without the oil removal step (S20).

That is, in the present embodiment, only when oil is detected through the oil detection step (S10), the oil removal step (S20) is performed, whereas when the oil is not detected, the oil removal step (S20) is not performed.

The oil detection step (S10) is a process for examining whether an oil film F to be removed is present on the surface of the welding target material W. The oil removal step (S20) is a process for removing the oil film F from the surface of the welding target material. The term "remove" includes not only the complete removal of the whole adhering oil, but also the removal of part of the oil, i.e., the reduction of the amount of oil. The nugget formation step (S30) is a process for melting the aluminum alloy plates W1 and W2 to form a nugget at a joint therebetween, thereby joining these aluminum alloy plates W1 and W2. Hereinafter, each step performed by the controller 100 will be described in detail.

Figure 4:
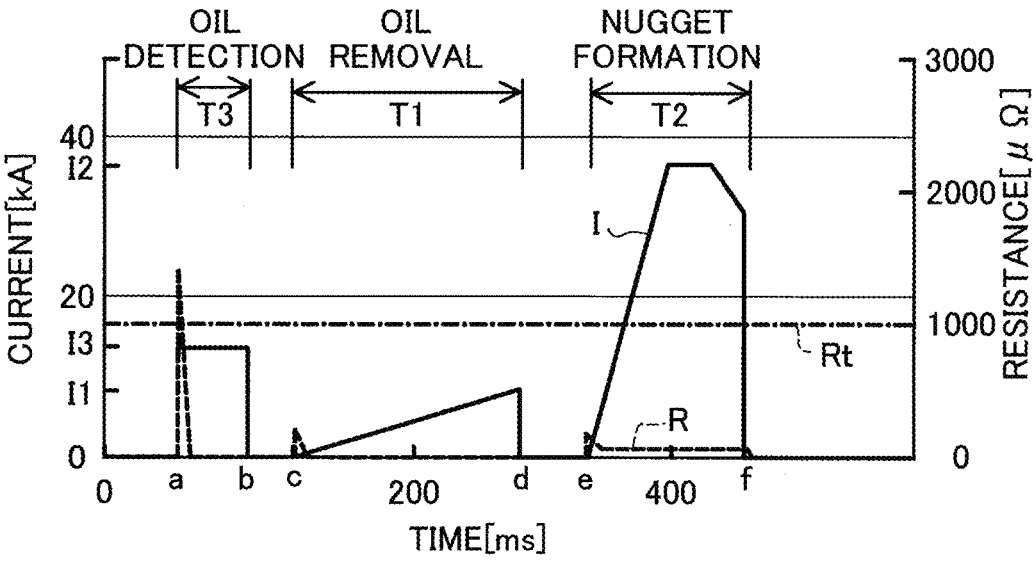
FIG. 4 is a diagram illustrating an example of changes in current value and resistance value during welding.

FIG. 4 is a diagram illustrating changes in current value I and resistance value R during welding. In FIG. 4, the change in current value I is indicated with a solid line, while the change in resistance value R is indicated with a dashed line. Meanwhile, the line of the upper limit of threshold Rt of the resistance value R for determining whether to execute the oil removal step (S20) is indicated with an alternate long and short dash line. The upper limit of threshold Rt is previously determined and stored in a memory (not shown) included in the controller 100. The upper limit of threshold Rt in the present embodiment is about 1000 $\mu\Omega$. The value of the upper limit of threshold Rt is variable as appropriate. In each step, the current regulating unit 102 regulates which changing pattern of a current value I is used for the energization based on various data.

First, the energization conditions in the respective processes (S10, S20, and S30) will be described. The energization conditions in the oil detection step (S10) is as follows.

Energization time T3 (corresponding to time a to time b in FIG. 4): 32 ms

Current value I3: 12 kA

The energization conditions in the oil removal step (S20) are as follows.

Energization time T1 (corresponding to time c to time d in FIG. 4): 100 ms

Maximum current value I1: 9 kA (corresponding to the maximum current value in the oil removal step (S20) at time d of FIG. 4, hereinafter also simply referred to as a "current value I1")

The current value I in the oil removal step (S20) gradually increases from 0 kA to 9 kA from time c to time d.

The energization conditions in the nugget formation step (S30) are as follows.

Energization time T2 (corresponding to time e to time f in FIG. 4): 70 ms

Maximum current value I2: 38 kA (corresponding to the maximum current value in the nugget formation step (S30) at time 400 ms of FIG. 4, hereinafter simply referred to as a "current value I2").

An interval section (time b to c, or time d to e) during which the energization is stopped only for a predetermined time is provided between the oil detection step (S10) and the oil removal step (S20) and between the oil removal step (S20) and the nugget formation step (S30).

In the oil detection step (S10), as indicated from time a to b in FIG. 4, the energization is performed for a specified time T3 at a certain specified current value I3 such that the changing pattern of the current value I forms a rectangular shape when viewed in time frame. FIG. 5 is a diagram illustrating a control flow in the oil detection step (S10). In the oil detection step (S10), as illustrated in FIG. 5, first, the voltage value measured by the voltage measuring unit 201 and the current value measured by the current measuring unit 202 are acquired by the resistance value calculation unit 103, and then a value of the electrical resistance is calculated from the acquired voltage value and current value in step 11 (hereafter, the step being abbreviated as "S").

Next, in S12, the determination unit 104 determines whether the resistance value R calculated in S11 is higher than or equal to the upper limit of threshold Rt. If the resistance value R is higher than or equal to the upper limit of threshold Rt (S12: YES), the operation proceeds to S13, in which the oil is determined to have been detected (oil detection). If the resistance value R is less than the upper limit of threshold Rt (S12: NO), the operation proceeds to S14, in which the oil is determined not to be detected (non-detection of oil). After S13 and S14, the operation continues to S15 illustrated in FIG. 3.

In an example illustrated in FIG. 4, the oil removal step (S20) is executed because the resistance value R at time a is higher than or equal to the upper limit of threshold Rt. The fact that the resistance value R is higher than or equal to the upper limit of threshold Rt means that the oil film F with high resistance is formed on the surface of the welding target material W. Therefore, the oil removal step (S20) is performed because excessive resistive heat generation may occur due to the oil film F if energization for welding is performed at a relatively high current value for the formation of a nugget without removing the oil film F or reducing its size.

In the oil removal step (S20), as indicated from time c to d in FIG. 4, the current value I during the energization is regulated by the current regulating unit 102 so that the changing pattern of the current increases linearly when viewed in time frame. In the oil removal step (S20), the oil film F adhering to the surface of the welding target material W is removed.

Then, in the nugget formation step (S30), as indicated from time e to time f in FIG. 4, the current value I during the energization is regulated by the current regulating unit 102 such that the changing pattern of the current value when viewed in time frame increases linearly after time e for a while, then the energization continues at a certain value of current (at the maximum current value of 38 kA in the nugget formation step (S30)), and subsequently the current falls. The maximum current value I2 in the nugget formation step (S30) is higher than the maximum current value I1 in the oil removal step (S20). The current increases to the maximum current value I2 in a short time, so that an increase rate per time of the current after the start of the nugget formation step (S30) is large. That is, in FIG. 4, the gradient of an upward line in the graph is large.

In other words, the changing pattern of the current value I in the oil removal step (S20) gradually increases over time, compared to the changing pattern in the nugget formation step (S30). The maximum current value I1 in the oil removal step (S20) is set low. That is, the relationships of I1<I2 and T1>T2 are satisfied. Furthermore, the current value I in each step (S10, S20, S30) increases in order of the oil removal step (S20), the oil detection step (S10), and the nugget formation step (S30) from the lowest. That is, the relationship of I1<I3<I2 is satisfied.

The energization time in each step (S10, S20, S30) increases in order of the oil detection step (S10), the nugget formation step (S30), and the oil removal step (S20) from the shortest. That is, the relationship of T3<T2<T1 is satisfied. Regarding an integrated amount of energization in each process (corresponding to the area of a portion defined by the lines of each step (S10, S20, S30) in the graph of FIG. 4), the integrated amount in the nugget formation step (S30) is greater than that in each of the other processes S10 and S20.

As illustrated in FIG. 4, at the start (time e) of the nugget formation step (S30), there is no drastic increase in the resistance value R that exceeds the upper limit of threshold Rt. This is because the oil film F on the surface of the welding target material W is removed to an appropriate extent in the oil removal step (S20), thereby suppressing sudden resistive heat generation during energization.

In the oil detection step (S10), the energization is performed at a certain current value I3 over time, and the current does not increase gradually over time, unlike the oil removal step (S20). The reason for this is to avoid the situation in which the accurate resistance value R cannot be obtained due to the influence of an induced electromotive force generated by gradually increasing the current.

Figure 6:
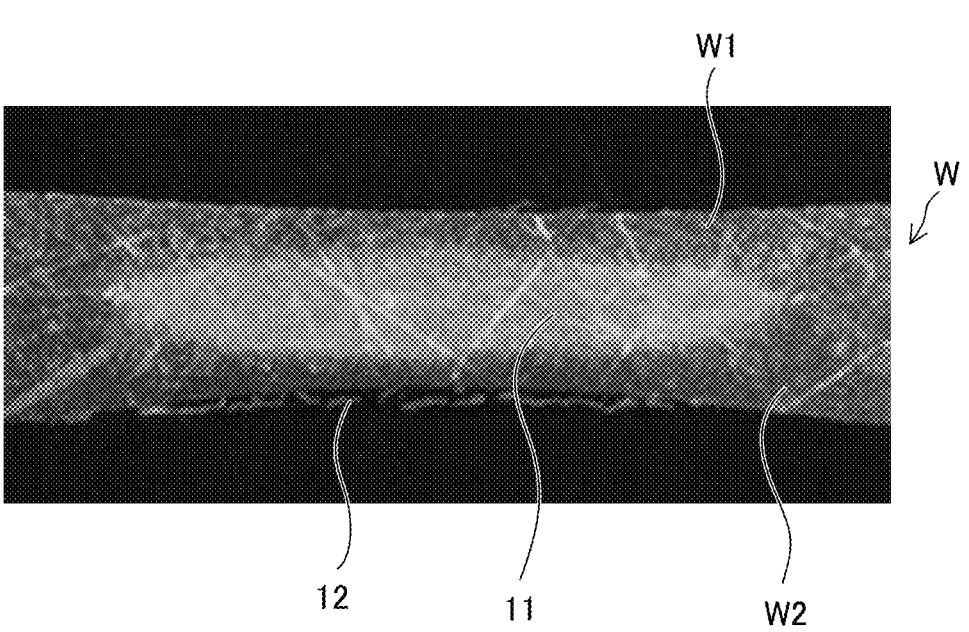
FIG. 6 is a diagram for explaining the state of the cross-section of a welding target material obtained after joining.

FIG. 6 is a diagram for explaining the state of the cross-section of the welding target material W joined, showing a photograph of the cross-section thereof taken on the plane along the energization direction. As illustrated in FIG. 6, a nugget 11 that grows appropriately in the radial and energization directions are formed. The nugget 11 is formed in an appropriate range without reaching the surface 12 of the aluminum alloy plate W2, that is, without excessively growing to the + pole side (the lower side in FIG. 6) along the energization direction.

A3. Preferred Conditions in the Oil Removal Step (S20):

Application conditions in the oil removal step (S20), obtained by a test conducted by the present applicant, will be discussed below. In this test, a metal plate W1 having a thickness of 0.8 mm and made of aluminum alloy (A6061)

and a metal plate W2 having a thickness of 1.0 mm and also made of aluminum alloy (A6061) were used as the welding target material W to be joined. A pressurizing force was 5 kN. The pressurizing force is preferably in a range of about 2 kN to about 10 kN.

FIG. 7 is a diagram illustrating joint test results obtained when changing the maximum current value and the energization time as appropriate. In the test which involved changing the maximum current value and the energization time as appropriate, it was comprehensively determined and evaluated whether a measured resistance value was sufficiently small and a nugget diameter was sufficiently large, and the results of this test were illustrated in three levels, namely, "A", "B", and "C" in Table M of FIG. 7. The level "A" indicates that the resistance value was sufficiently small, excessive growth of the nugget in the energization direction was suppressed, and the nugget diameter was sufficiently large. The level "B" indicates that reduction in the resistance value was observed, but the nugget diameter was decreased, suggesting insufficient joint strength. The level "C" indicates that reduction in the resistance value was not observed, and the nugget grew excessively toward the energization direction.

As can be seen from FIG. 7, the appropriate conditions are the conditions on which the level "A" is obtained, that is, it is preferable to satisfy the energization time of 50 ms or more and 100 ms or less and the maximum current value of 5 kA or more and 9 kA or less. Note that it is also preferable to have an energization time of 50 ms or more and 120 ms or less, as well as the maximum current value of 5 kA or more and 12 kA or less from the viewpoint of reducing the resistance value and suppressing the fusion between the electrode 3 and the metal plate W2 in consideration of the evaluation of the level "B" as well. Furthermore, substantially the same results as those of Table M in FIG. 7 are obtained in another test using, instead of the welding target material W to be joined, a combination of plates (one plate of 0.8 mm in thickness and the other plate of 1.8 mm in thickness) made of an aluminum alloy (6T02-T4), which is different from the material in the above-described test.

Figure 9:
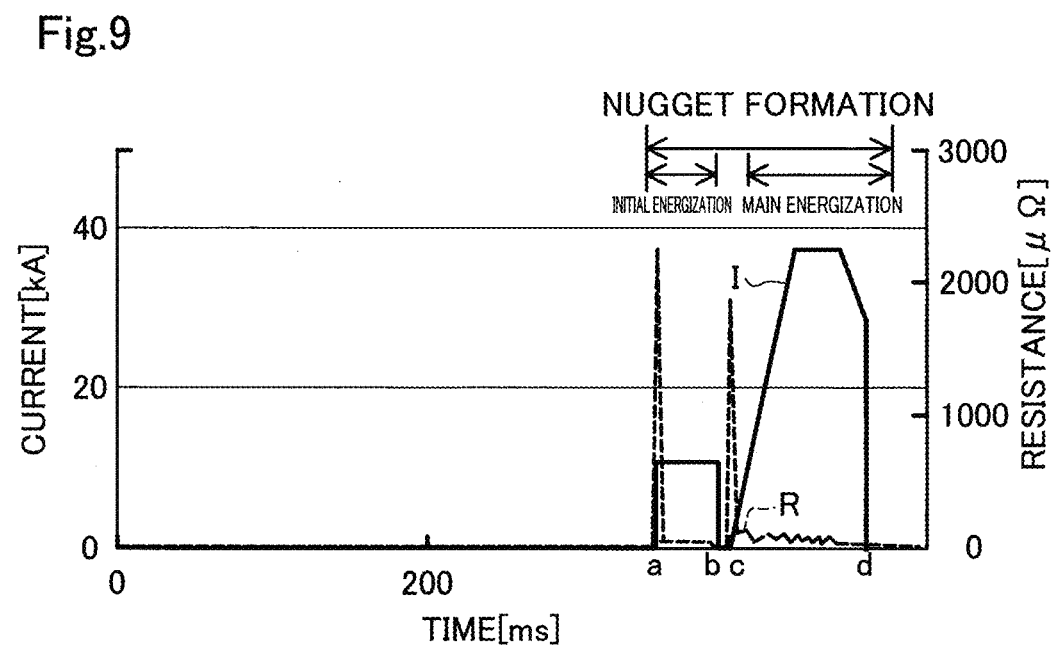

[Effects] (1) FIG. 9 is a diagram illustrating changes in the current value and the resistance value during welding in a welding method of a comparative embodiment which does not include the oil removal step (S20). This method is a resistance spot welding method of a welding target material W having an oil film F on its surface, as in the first embodiment. The nugget formation step (S30) in the comparative embodiment illustrated in FIG. 9 includes an initial energization and a main energization. After the initial energization is performed only for a predetermined period of time (from time a to time b), the energization is stopped during the interval, specifically, only for a predetermined period of time (from time b to time c), and thereafter the main energization is performed (from time c to time d). The welding current value during the main energization is set higher than the welding current value during the initial energization.

Figure 10:
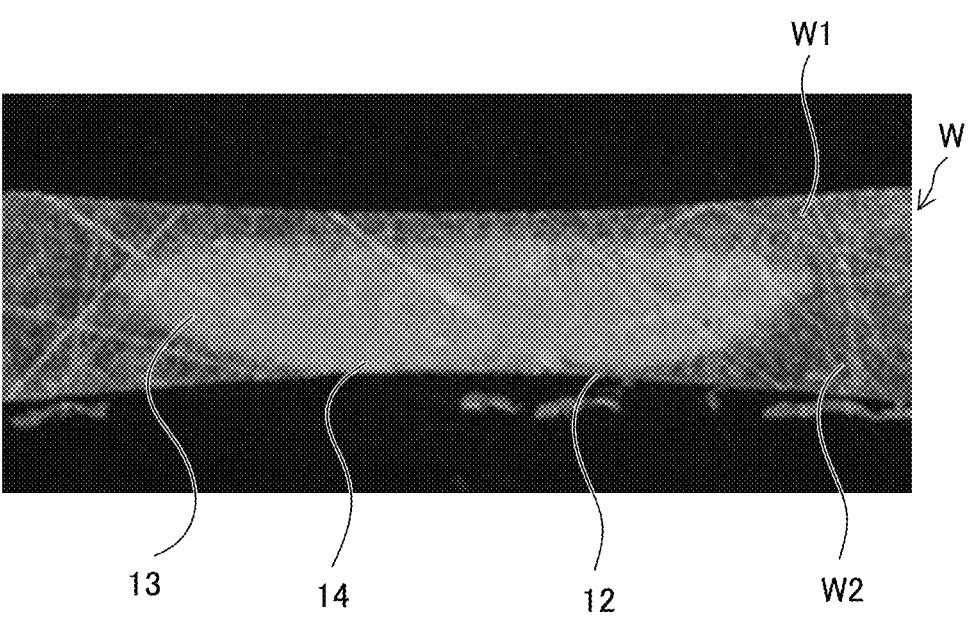
FIG. 10 is a diagram for explaining the state of the cross-section of a welding target material obtaining after joining in the comparative embodiment.

As illustrated in FIG. 9, in the comparative embodiment, the electrical resistance values R both at the start of the initial energization (time a) and at the start of the main energization (time c) exceed 2000 μΩ. FIG. 10 is a diagram for explaining the state of the cross-section of the welding target material W joined in the comparative embodiment, showing a photograph of the cross-section thereof taken on the plane along the energization direction. As illustrated in FIG. 10, excessive growth of a nugget 13 to the + pole side (the lower side in FIG. 10) along the energization direction is promoted due to the excessive resistive heat generation by the oil film F during welding. Thus, the nugget 13 grows up to the surface 12 of the aluminum alloy plate W2 located on the lower side. When welding is performed in such a condition, the surface temperature of the electrode 3 of the resistance spot welding apparatus 10 increases, thus causing a problem of fusing the electrode 3 and the metal plate W2 together.

In this regard, according to the resistance spot welding apparatus 10 and the resistance spot welding method of the first embodiment described above, the oil on the surface of the welding target material W can be removed in the oil removal step (S20) before the nugget formation step (S30). Thus, in the subsequent nugget formation step (S30), the excessive resistive heat generation due to the oil previously adhering to the welding target material W can be reduced, thereby suppressing fusion between the electrode 3 and the metal member W2 and thus avoiding a problem of damaging the electrode 3.

(2) The oil removal step (S20) suppresses melting and mutual adhesion of the metal members W1 and W2 because the energization is performed at a current value lower than a current value in the nugget formation step (S30) (I1<I2). Then, the oil removal step (S20) and the nugget formation step (S30) can be achieved by changing the current value using the same configuration of the apparatus, leading to reduction in cost, compared to a case in which the oil removal is achieved by heating with a heater or the like and a case in which the oil removal is achieved by using a solution.

(3) In the above first embodiment, the energization time T1 of the oil removal step (S20) is longer than the energization time T2 of the nugget formation step (S30) (T1>T2). Thus, heat can be transferred to a wider range from positions where the electrodes 2 and 3 are in contact with the oil film F on the surface, compared to a case of performing energization for a shorter period of time than the energization time T2 of the nugget formation step (S30). The oil film F can be removed more surely while suppressing melting and mutual adhesion of the metal members W1 and W2.

(4) In the oil removal step (S20) of the above first embodiment, the current value I is gradually increased over time. Thus, the current integrated amount can be reduced, compared to a case in which energization is performed at a certain current value for the same period of time.

(5) In the resistance spot welding apparatus 10 and the resistance spot welding method of the first embodiment described above, the electrical resistance value R is acquired in the oil detection step (S10), and the oil removal step (S20) is performed when the acquired electrical resistance value R is higher than or equal to the predetermined upper limit of threshold Rt. That is, the oil removal can be performed in a situation where the electrical resistance value R is high and oil is more likely to adhere onto the surface of the welding material to the extent that it causes excessive resistive heat generation during welding. In addition, the oil removal step (S20) is not performed in a situation where the electrical resistance value R is low and oil is less likely to adhere onto the surface to the extent that it causes excessive resistive heat generation during welding, thereby making it possible to prevent useless energization from being performed.

(6) Energization conditions for the oil removal step (S20) of the first embodiment above include: an energization time T1 of 50 to 100 ms and a current value I1 in a range of 5 to 9 kA. This can form a nugget that has an appropriate diameter while suppressing fusion between the electrode 2 and the metal plate W1 and between the electrode 3 and the metal plate W2, resulting in a favorable joint strength of a weld portion between the aluminum alloy plates W1 and W2.

B. Second Embodiment

Figure 8:
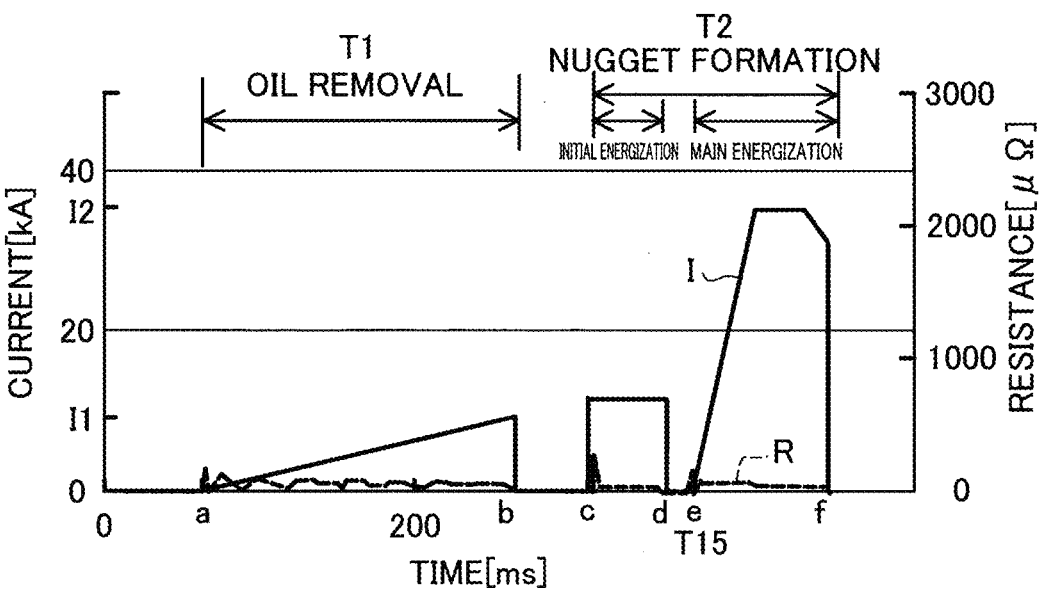
FIG. 8 is a diagram illustrating an example of changes in current value and resistance value during welding in a second embodiment.

Next, a resistance spot welding method of a second embodiment of the present disclosure will be described with reference to FIG. 8. FIG. 8 is a diagram illustrating changes in current value and resistance value during welding in the second embodiment. The configuration of the resistance spot welding apparatus 10 is the same as that in the first embodiment, and thus a description thereof will be omitted.

(5) In the above first embodiment, the subsequent oil removal step (S20) is performed when the resistance value R acquired in the oil detection step (S10) is higher than or equal to the upper limit of threshold Rt. That is, it is determined whether the oil film F needs to be removed or not, and then only if the removal is determined to be necessary, the oil removal step (S20) is performed. However, in the second embodiment, the oil detection step (S10) is not performed.

As illustrated in FIG. 8, in the resistance spot welding method of the second embodiment, first, the oil removal step (S20) is performed (time a to time b). After the oil removal step (S20), the nugget formation step (S30) is performed. The nugget formation step (S30) in the second embodiment includes the initial energization (time c to time d) and the main energization (time e to time f), as in the above comparison embodiment (see FIG. 9). The relationships regarding the current value and the energization time between the oil removal step (S20) and the nugget formation step (S30) are the same as those in the first embodiment (I1<I2, T1>T2).

Also in the present embodiment, the oil removal step (S20) is performed surely, thereby making it possible to exhibit the same effects (1) to (4) and (6) as those of the above first embodiment.

C. Other Embodiments (C1) In the nugget formation step (S30) of the above first embodiment, the initial energization may be performed before the main energization as in the second embodiment.

(C2) In each of the above embodiments, a description has been given on the case where the present disclosure is applied as the resistance spot welding method and the resistance spot welding apparatus 10 for welding the two aluminum alloy plates W1 and W2 together. The present disclosure is not limited to this and may be applied as a resistance spot welding apparatus for welding three or more plates (metal plates) together. The material of the metal plate that is applicable to the resistance spot welding apparatus 10 of the present disclosure is not limited to aluminum alloy, but can also be iron (steel), magnesium, titanium, copper, or the like. The present disclosure can also be applied to welding of different kinds of metals.

(C3) In each of the above embodiments, the voltage value measured by the voltage measuring unit 201 and the welding current value measured by the current measuring unit 202 were used when calculating an electrical resistance value R by the resistance value calculation unit 103. The present disclosure is not limited thereto, and a voltage value measured by the voltage measuring unit 201 and a welding current value (fixed value) preset may be used.

(C4) In each of the above embodiments, the current value I is increased over time in the oil removal step (S20), but the energization may be performed at a certain current value from the beginning.

The present disclosure is not limited to each of the above embodiments, and various modifications can be made to them to form various configurations without departing from the spirit of the present disclosure. For example, the technical features in the embodiments corresponding to the technical features in each of the aspects described in "SUMMARY" can be replaced or combined as appropriate to solve some or all of the problems described above or to achieve some or all of the effects described above. Unless the technical feature is described herein as essential, it can be deleted as appropriate. For example, the present disclosure may be implemented by embodiments described below.

(1) According to one aspect of the present disclosure, a resistance spot welding method is provided. The resistance spot welding method is a method in which a welding target material including a plurality of metal members overlapping each other is joined by being sandwiched between a pair of electrodes and energized with the electrodes, a surface of the welding target material facing the electrode being provided with oil, the method including the steps of: removing at least part of the oil on the surface by energization between the pair of electrodes; and after the oil removal step, forming a nugget in an overlapped portion of the welding target material by energization between the pair of electrodes.

According to this embodiment, the oil on the surface of the welding target material can be removed in the oil removal step. Thus, in the subsequent nugget formation step, excessive resistive heat generation due to the oil previously adhering to the welding target material can be reduced, thereby suppressing fusion between the electrode and the metal member.

The oil removal step and the nugget formation step can be achieved by using the same configuration, thus leading to reduction in cost, compared to a case in which oil removal is achieved by heating with a heater or the like or by using a solution.

(2) In the above embodiment, wherein, when a maximum current value in the oil removal step is I1, and a maximum current value in the nugget formation step is I2, a relationship of I1<I2 may be satisfied. According to this embodiment, fusion between the electrodes and the metal member can be suppressed while suppressing melting and mutual adhesion of the metal members because the energization is performed in the oil removal step at the maximum current value which is lower than the maximum current value in the nugget formation step (I1<I2).

(3) In the above embodiment, when an energization time of the oil removal step is T1, and an energization time of the nugget formation process is T2, a relationship of T1>T2 may be satisfied. According to this embodiment, in the oil removal step, the energization is performed for a longer time than in the nugget formation step. Thus, heat can be transferred to a wider range from positions where the electrodes are in contact with the surface of the welding target material, compared to a case of performing energization for a period of time shorter than or equal to the energization time of the nugget formation step. In addition, since the relationships of I1<I2 and T1>T2 are satisfied, the oil can be removed more surely while suppressing melting and mutual adhesion of the metal members.

(4) In the above embodiment, in the oil removal step, the energization may be performed while increasing the current value for the oil removal step over time. According to this embodiment, since the current value is increased over time in the oil removal step, the oil can be removed in a state where the current integrated amount is being reduced, compared to a case in which energization is performed at a certain current value for the same period of time.

(5) In the above embodiment, the resistance spot welding method may further include the step of: before performing the oil removal step, detecting oil by acquiring an electrical resistance value through energization between the pair of electrodes at a certain current value over time and determining whether the acquired electrical resistance value is higher than or equal to a predetermined threshold, wherein the oil removal step may be performed if the electrical resistance value is determined to be higher than or equal to the predetermined threshold in the oil detection step, and wherein the oil removal step may not be performed if the electrical resistance value is determined to be lower than the predetermined threshold.

According to this embodiment, the oil removal step is performed when the electrical resistance value is acquired in the oil detection step and the acquired electrical resistance value is higher than or equal to the predetermined threshold. Thus, the oil removal can be performed in a situation where the electrical resistance value is high and oil is more likely to adhere onto the surface of the welding target material to the extent that it causes excessive resistive heat generation during welding. In addition, the oil removal step is not performed in a situation where the electrical resistance value is low and oil is less likely to adhere onto the surface to the extent that it causes excessive resistive heat generation during welding, thereby making it possible to prevent useless energization from being performed.

(6) In the above embodiment, when a maximum current value in the oil removal step is I1, a maximum current value in the nugget formation step is I2, and a maximum current value in the oil detection step is I3, a relationship of I1<I3<I2 may be satisfied. According to this embodiment, the current value in the oil removal step is higher than the maximum current value in the oil removal step and lower than the maximum current value in the nugget formation step. Thus, the electrical resistance value can be acquired without using excessive high current or excessive low current, and the electrical resistance value can be acquired with high accuracy without forming any nugget.

(7) In the above embodiment, the plurality of metal members is made of aluminum or an aluminum alloy. In welding aluminum or aluminum alloys to each other, the fusion phenomenon between the electrode and the metal member is more likely to occur because aluminum has a low melting point and is soft. According to the above embodiment, the fusion between the electrode and the metal member can be suitably suppressed in the joining of the metal members containing aluminum which is more likely to cause fusion.

(8) In the above embodiment, in the oil removal step, an energization time is 50 ms or more and 100 ms or less, and a maximum current value is 5 kA or more and 9 kA or less. According to the above embodiment, a nugget with a suitable size can be formed while suppressing fusion between the electrode and the metal member.

(9) The present disclosure can also be achieved by various aspects. For example, the present disclosure can be realized in the forms of the resistance spot welding apparatus, an energization control method in resistance spot welding, a computer program for implementing the apparatus or method, a non-temporary recording medium having the computer program recorded therein, and the like.

What is claimed is:

1. A resistance spot welding method, in which a welding target material including a plurality of metal members overlapping each other is joined by being sandwiched between a pair of electrodes and energized with the electrodes, a surface of the welding target material facing the electrode being provided with oil, the method comprising the steps of:

removing at least part of the oil on the surface by energization between the pair of electrodes; and after the oil removal step, forming a nugget in an overlapped portion of the welding target material by energization between the pair of electrodes, wherein a changing pattern of a current value in the removing at least part of the oil on the surface more gradually increases over a first period of time compared to an increasing pattern of a current value in the forming the nugget over a second period of time.

2. The resistance spot welding method according to claim 1, wherein, when a maximum current value in the oil removal step is I1, and a maximum current value in the nugget formation step is I2, a relationship of I1<I2 is satisfied.

3. The resistance spot welding method according to claim 1, wherein, when an energization time of the oil removal step is T1, and an energization time of the nugget formation process is T2, a relationship of T1>T2 is satisfied.

4. The resistance spot welding method according to claim 1, wherein in the oil removal step, the energization is performed while increasing the current value for the oil removal step over time.

5. The resistance spot welding method according to claim 1, further comprising the step of: before performing the oil removal step, detecting oil by acquiring an electrical resistance value through energization between the pair of electrodes at a certain current value over time and determining whether the acquired electrical resistance value is higher than or equal to a predetermined threshold, wherein the oil removal step is performed if the electrical resistance value is determined to be higher than or equal to the predetermined threshold in the oil detection step, and wherein the oil removal step is not performed if the electrical resistance value is determined to be lower than the predetermined threshold.

6. The resistance spot welding method according to claim 5, wherein, when a maximum current value in the oil removal step is I1, a maximum current value in the nugget formation step is I2, and a maximum current value in the oil detection step is I3, a relationship of I1<I3<I2 is satisfied.

7. The resistance spot welding method according to claim 1, wherein the plurality of metal members is made of aluminum or an aluminum alloy.

8. The resistance spot welding method according to claim 7, wherein in the oil removal step, an energization time is 50 ms or more and 100 ms or less, and a maximum current value is 5 kA or more and 9 kA or less.

9. A resistance spot welding apparatus, comprising:

a pair of electrodes that sandwich therebetween a welding target material including a plurality of metal members overlapping each other; and a controller that controls energization of the pair of electrodes, wherein the controller performs the control such that the pair of electrodes is energized at a current value for removing at least part of oil provided on a surface of the welding target material that faces the electrode and then also energized at a current value for forming a nugget in an overlapped portion of the welding target material; and wherein the controller performs the control such that a changing pattern of the current value in the removing at least part of the oil on the surface more gradually increases over a first period of time compared to an increasing pattern of the current value in the forming the nugget over a second period of time.

10. The resistance spot welding method according to claim 1, wherein in the nugget formation step, the energization comprises an initial energization and a main energization.

11. The resistance spot welding method according to claim 10, wherein a maximum current value during the main energization is higher than a maximum current value during the initial energization.

12. The resistance spot welding method according to claim 10, wherein in the initial energization is performed before the main energization.

13. The resistance spot welding method according to claim 12, wherein the initial energization is performed for a first predetermined period of time;

after the first predetermined period of time has passed, the initial energization stops and no energization is performed for a second predetermined period of time; and after the second predetermined period of time has passed, the main energization is performed for a third predetermined period of time.

* * * * *